United States Patent

Lee et al.

[15] 3,697,887
[45] Oct. 10, 1972

[54] LASER FREQUENCY STABILIZATION SYSTEM AND METHOD

[72] Inventors: Paul H. Lee, Goleta, Calif.; Michael L. Skolnick, Norwalk, Conn.

[73] Assignee: The Perkin-Elmer Corporation, Norwalk, Conn.

[22] Filed: Dec. 23, 1968

[21] Appl. No.: 786,178

[52] U.S. Cl. .................331/94.5, 350/160, 356/106
[51] Int. Cl. ..............................................H01s 3/10
[58] Field of Search .......331/94.5; 356/106; 350/160

[56] References Cited

UNITED STATES PATENTS 3,445,787  5/1969  Hotz..........................331/94.5
3,453,557  7/1969  Polanyi et al.............331/94.5

Primary Examiner—William L. Sikes
Attorney—Edward R. Hyde, Jr.

[57] ABSTRACT

A method of stabilizing the operating frequency of a laser which includes comparing by means of interference the relative phase of two beams of radiant energy from the laser, one of which is a reference while the other passes through the active lasing material. The optical path traversed by the reference beam is adjusted to produce a selected condition at the point of interference when the laser is oscillating at a frequency which corresponds exactly to an anomaly in the dispersion of the lasing material. Thereafter, the laser frequency is stabilized by adjusting its operating frequency to maintain this condition. Preferably, the comparison is made by varying the reference phase about the selected value. Apparatus for performing this method includes means defining two substantially equal optical paths for radiation emitted by the laser, one of which extends through the active material of the laser. The two paths are terminated at the same point so that interference occurs and the apparatus includes means for detecting the output from the point of interference. Finally, means are provided for controlling the laser frequency to maintain a predetermined interference condition.

2 Claims, 15 Drawing Figures

PATENTED OCT 10 1972 3,697,887

INVENTORS.
Paul H. Lee
Michael L. Skolnick
BY Edward D. Murphy
ATTORNEY

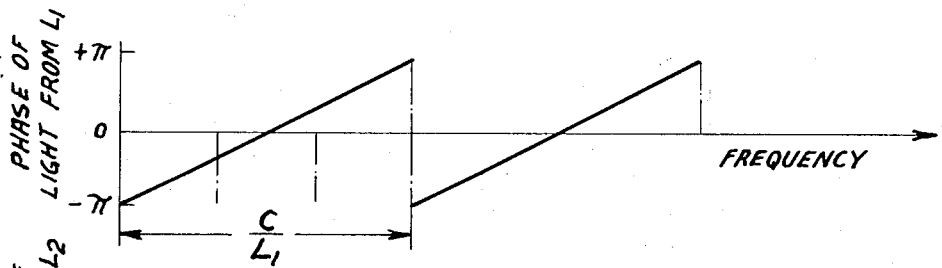
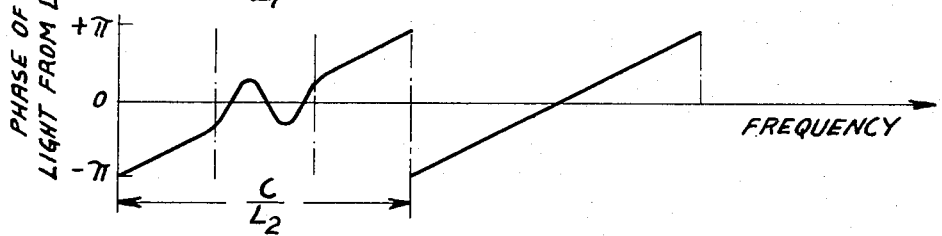
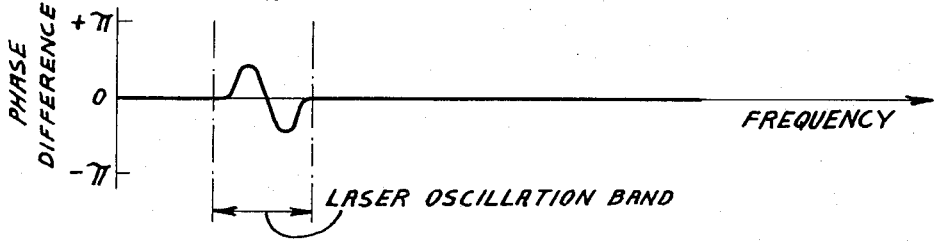
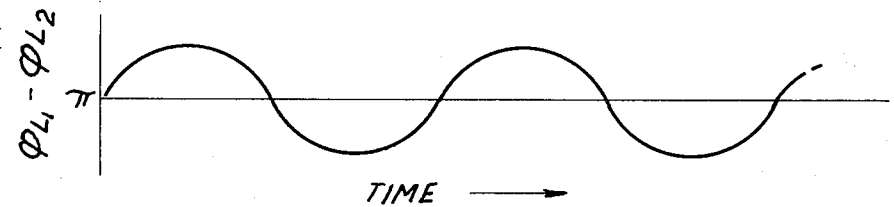
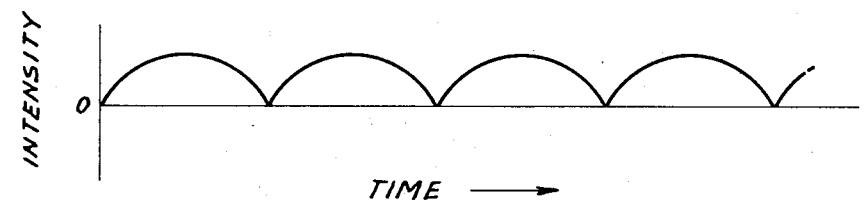
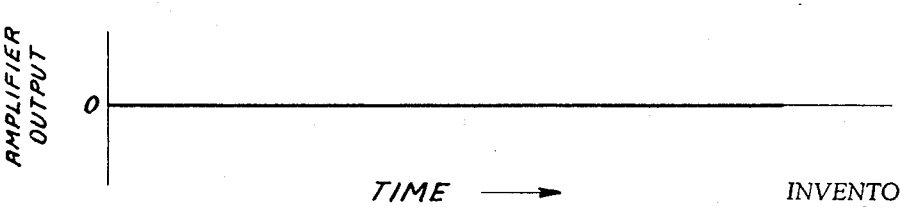

INVENTORS:
Paul H. Lee
BY Michael L. Skolnick

Edward D. Murphy
ATTORNEY.

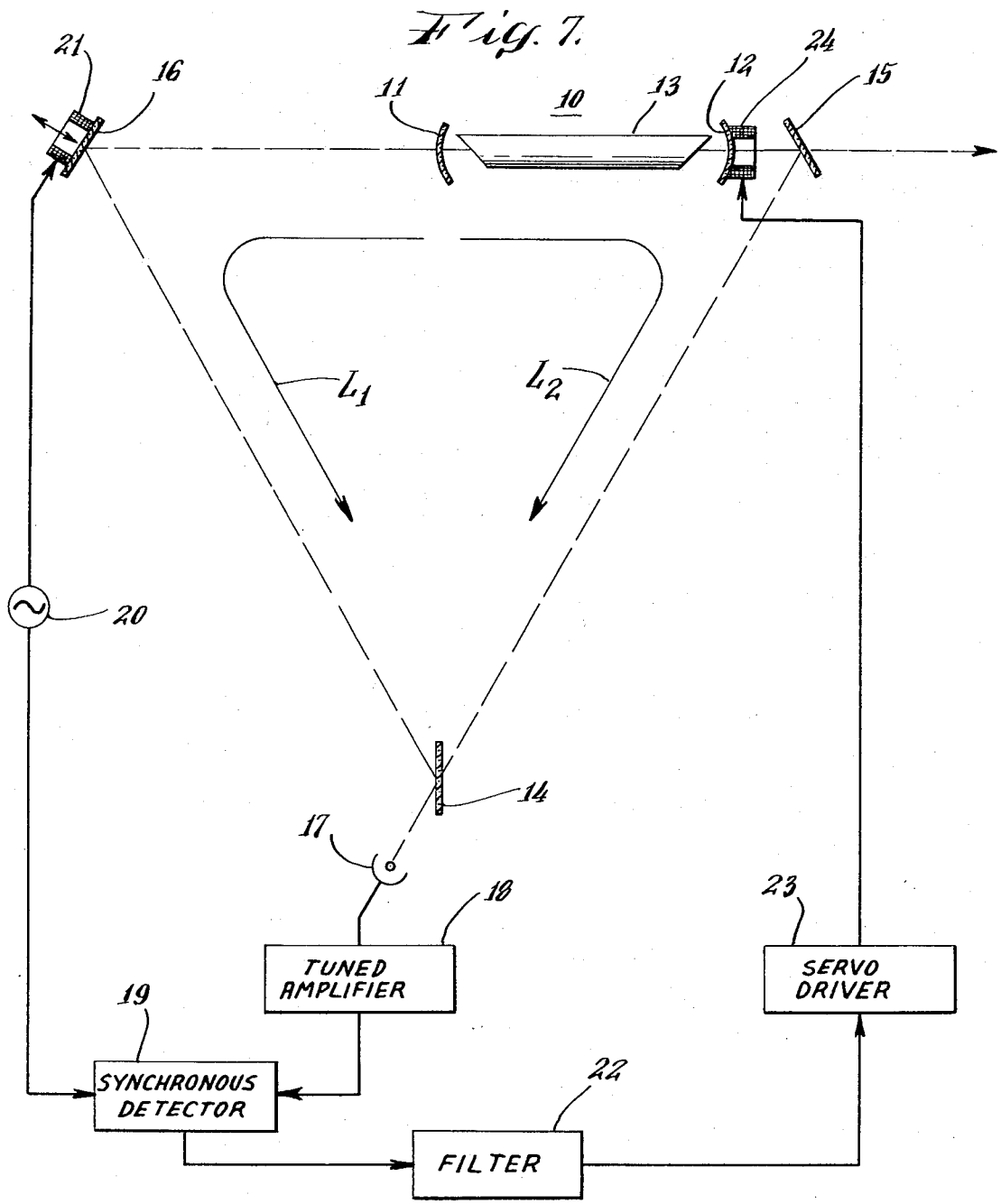

LASER FREQUENCY STABILIZATION SYSTEM AND METHOD

This invention relates to an improved system for laser frequency stabilization which permits very precise absolute stabilization of the laser frequency with simplified equipment.

Frequency stabilization systems for lasers have previously been based on a variety of techniques for establishing a reference value so that differences of the laser frequency from that value can be detected and compensated. However, these systems are subject to a variety of difficulties. For example, some systems reference the laser to a relatively broad peak or valley in the power output vs. frequency characteristics, thus making it difficult to precisely regulate the laser. Other methods require modulating the laser frequency about its reference value but this cannot be tolerated in many applications. Still other arrangements have recently been provided which permit extremely precise regulation of the laser frequency; however, the equipment required by these systems is often complex and expensive. Accordingly, it is the purpose of this invention to provide a novel method and system for laser frequency stabilization which permits precise frequency stabilization of lasers to be readily achieved without any modulation of the laser frequency.

Therefore, it is an object of this invention to provide a new and improved method of laser frequency stabilization.

It is another object of this invention to provide a new and improved apparatus for laser frequency stabilization.

It is also an object of this invention to provide a new and improved method of frequency stabilization for lasers which is based on a precisely defined reference frequency which is characteristic of the laser material.

Another object of this invention is the provision of a new and improved apparatus for laser frequency stabilization wherein comparison of the laser frequency to a reference value is performed without disturbing the laser cavity operating frequency except for corrective movement.

Briefly, in accord with one embodiment of this invention a method of frequency stabilization for lasers is provided which includes interferometric optical phase comparison of two beams obtained from the laser, one of which is a reference while the other includes the active material of the laser in its path. The reference beam is adjusted to have a path length which corresponds to that of the beam which passes through the laser when the laser is operating at the center of an anomaly in the dispersion curve of the material. Thereafter, shifts of the laser frequency from the center of the anomaly result in a rapid change in the index of refraction of the active material which are readily detected as shifts in phase of the beam passing through the active material and are corrected. In further accord with this invention, apparatus is provided for establishing the reference and laser beams which are to be compared. This apparatus includes means for providing a path for the reference beam from an end of the laser cavity to an interferographic means and means for providing a path of corresponding length between the corresponding points but extending through the active material. The apparatus further includes means for modulating the optical path length of the reference beam to introduce phase modulation of the reference beam, means for synchronously comparing the intensity modulation of the interferometer output with the modulation signal and means for controlling the oscillating frequency of the laser in accord with this comparison.

The novel features believed characteristic of this invention are set forth in the appended claims. The invention itself, together with further objects and advantages thereof, may best be understood by reference to the following description taken in connection with the appended drawings in which:

FIGS. 3a, 3b and 3c represent variation of phase with frequency in the apparatus of FIG. 1;

FIGS. 4a, 4b and 4c represent the signals which appear at various points in the apparatus of FIG. 1 when the laser is correctly tuned;

FIG. 7 is a schematic illustration of an alternative embodiment of this invention.

Figure 1:
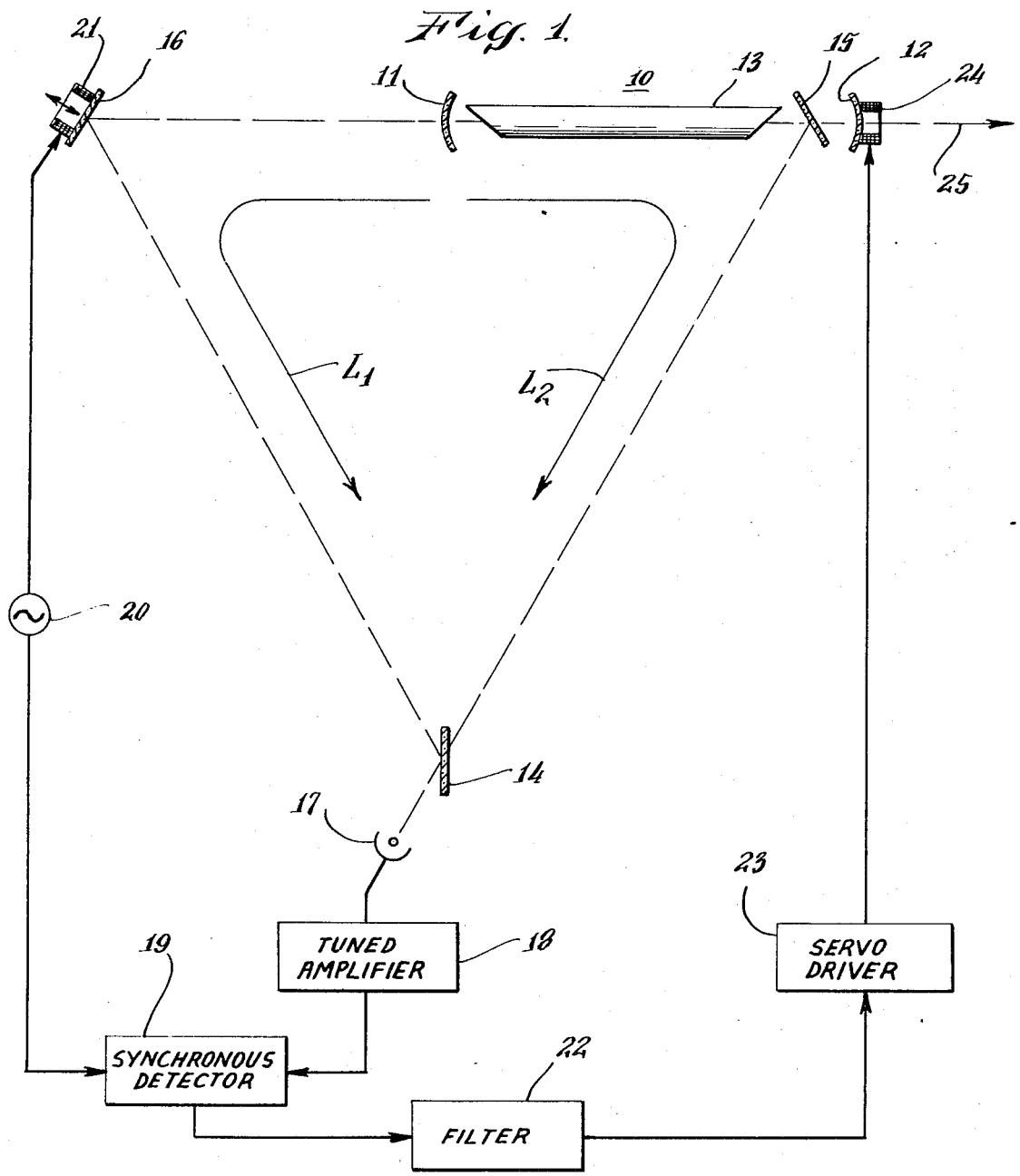
FIG. 1 is a schematic illustration of a frequency stabilization system in accord with a preferred embodiment of this invention.

In FIG. 1, a laser 10 is shown, the frequency of which is to be stabilized in accord with the present invention. A major proportion of the laser output, beam 25, is directed elsewhere for use in a system not shown. The laser 10 may be any device operating on the maser principle which produces a beam of coherent electromagnetic radiation. In general, the laser comprises a pair of mirrors 11, 12 which define a resonant cavity and which emcompass an active material. In the case of gas lasers, the active material may be provided in an enclosure 13. For example, the active material may comprise carbon dioxide which emits at a wavelength of 10.6 microns when an electric discharge is produced by a power supply (not shown).

The laser 10 is placed in an interferometer having two arms indicated generally by the arrows $L_1$ and $L_2$. These arms extend between mirror 11 and a beamsplitter 14. The interferometer arm $L_2$ also includes a beamsplitter 15 which is partially reflective so as to reflect a suitable amplitude of the internal radiation along the path of the interferometer arm $L_2$. Mirror 12 is made partially transmissive to provide a portion of the internal radiation as a power output beam. The other arm, $L_1$, of the interferometer extends between the laser resonator mirror 11 which is partially transmissive and the beamsplitter 14. A movable mirror 16 is provided for modulation and fine adjustment of the path length of arm $L_1$.

The beamsplitter 14 is subjected to the two beams of light from the opposing arms of the interferometer and, since these beams are coherent, interference occurs between them. A detector 17 is provided, for example, a photocell, to produce an electronic signal corresponding to the optical power from beamsplitter 14.

This signal contains an a.c. component which results from the power modulation caused by the phase modulation of path $L_1$. This a.c. signal is applied through a tuned amplifier 18 to a synchronous detector 19 which compares it with the signal received from an oscillator 20. The oscillator 20 also drives the movable mirror 16 by means of a suitable transducer such as a piezoelectric mount 21. The amplifier is tuned to the oscillator frequency and the synchronous detector compares the signal from the photocell with the oscillator signal which also varies the reference path length $L_1$. The output from the synchronous detector is coupled through a filter 22 to a servo driver 23 which in turn is coupled to a transducer mount 24 for mirror 12. Because the initial phase adjustment of $L_1$ for destructive interference (180° optical phase difference) results in zero output of the synchronous detector, any output signal which results from a change in the laser frequency causes a correction signal in the servo system which causes a corresponding movement of the mirror to adjust the oscillating frequency of the laser to maintain zero output of the synchronous detector.

Figure 2:
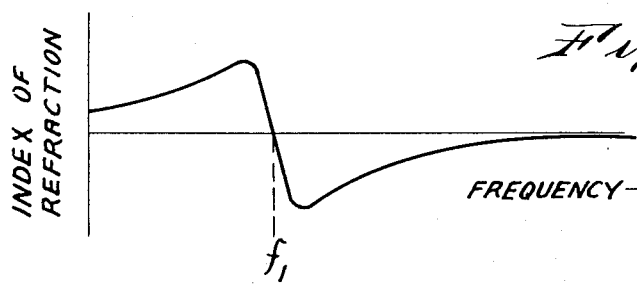
FIG. 2 is a representative plot of the dispersion of a material which includes an anomaly.

As can be seen from the above-described structure, the only important optical difference between the reference path $L_1$ and the second interferometer path $L_2$ is that $L_2$ includes the active material of the laser. The optical phase difference introduced by a change in laser frequency is illustrated in the diagrams of FIGS. 2 and 3. In FIG. 2, the variation of refractive index with frequency in a given material such as carbon dioxide is shown. In general, the refractive index of a medium increases slowly with increasing frequency. However, in many materials, such as carbon dioxide, one or more rapid changes occurs in the index of refraction curve. The refractive index shifts rapidly at these frequencies to a lower value. These shifts correspond to lines in the absorption spectrum of the material. In FIG. 2, such a discontinuity occurs about the frequency $f_1$. These discontinuities are known as anomalies and the subject is generally termed anomalous dispersion.

FIGS. 3a, 3b and 3c respectively illustrate typical phase shifts in each arm of the apparatus of FIG. 1 as a function of optical frequency about one of the anomalous frequencies for the material and the resulting phase difference at the beamsplitter 14. In FIG. 3a, the phase of light in path $L_1$ varies linearly with a linear change in the operating frequency of the laser since the path is unobstructed. In FIG. 3b, the phase of light from path $L_2$ fluctuates as the frequency is varied through the point corresponding to the anomaly. This fluctuation of phase occurs because, as the frequency moves through the point of the anomaly, the refractive index of the lasing material shifts, thus changing the speed of light in the path $L_2$ and producing an apparent variation in path length. FIG. 3c illustrates the phase difference between light from paths $L_1$ and $L_2$ as the frequency is scanned.

In order to utilize this phase fluctuation, an arrangement must be made so that distinguishable indications can be obtained as to whether the laser is operating at the desired frequency or whether it has shifted above or below the desired frequency. Accordingly, the length of the path $L_1$ is adjusted so that the two light beams are exactly 180° out of phase when the laser is operating at the desired frequency, specifically at the center of the fluctuation in FIG. 3b. The laser is initially tuned to this value by direct movement of one of the cavity mirrors so that beams $L_1$ and $L_2$ destructively interfere to produce a black condition at the photocell.

A shift in the laser frequency will result in a phase difference other than 180° between the beams from $L_1$ and $L_2$ and, in this case, the destructive interference is not complete. Therefore, since the laser has a frequency either higher or lower than the reference frequency, there will be an increase in the intensity of the combined beam from the beamsplitter. The sense (sign) of the laser frequency shift is determined by modulating the phase of the reference beam $L_1$ about this value producing an intensity modulation at the photocell and synchronous detecting the resulting photocell output.

If the laser is tuned to the center of the anomaly, the photocell output will have no component at the modulation frequency but only a component at twice the modulation frequency. The synchronous detector receives no signal in this case due to the action of amplifier 18. The relative signals for this situation are shown in FIGS. 4a, 4b and 4c.

Figure 5A:
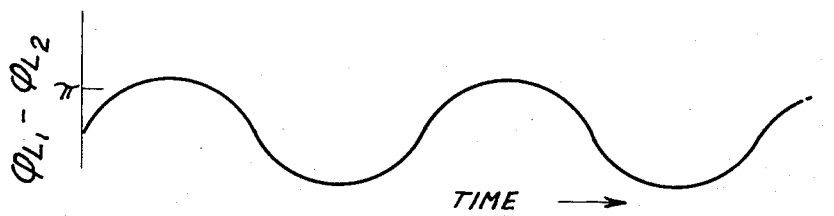
FIGS. 5a, 5b and 5c represent the signals which appear at various points in the apparatus of FIG. 1 when the laser frequency is too low.
Figure 5B:
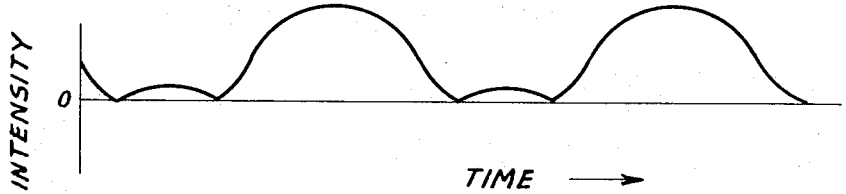
Figure 6A:
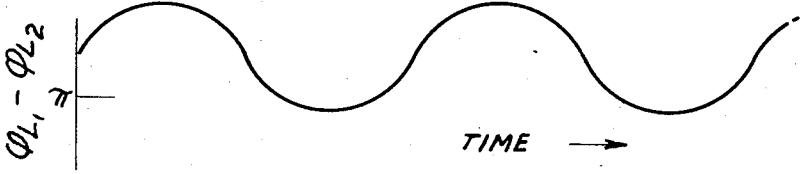
FIGS. 6a, 6b and 6c represent the signals which appear at various points in the apparatus of FIG. 1 when the laser frequency is too high.
Figure 6B:
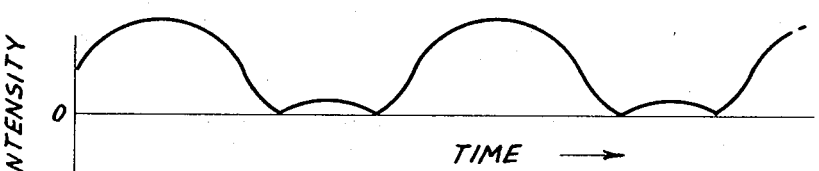

Detuning of the laser frequency results in the appearance of a signal at the modulation frequency. The amplitude of this signal is proportional to the optical phase difference between the two interfering light beams, which in turn is proportional to the laser shift from the desired frequency for small shifts. The phase of this signal, with respect to the oscillator signal, is determined by the sign of the laser detuning. If the laser frequency changes, for example, in a decreasing direction, the relative amplitudes of the alternate pulses change and the signal produced by the photocell changes correspondingly. FIGS. 5a and 5b represent these signals while FIGS. 6a and 6b represent these signals when the frequency has increased. Electrically, these photocell outputs correspond to a signal made up of a plurality of constant-frequency signals, one of which is at the frequency of the oscillator. Thus, by means of the tuned amplifier 18 which only passes signals which are at the same frequency as that of the oscillator, the signal corresponding to correct tuning and any higher harmonic frequencies present in the mistuned situation can be eliminated. Accordingly, the synchronous detector 19 receives only that component of the photocell output which is at the same frequency as the oscillator and which corresponds to error in the laser tuning.

Figure 5C:
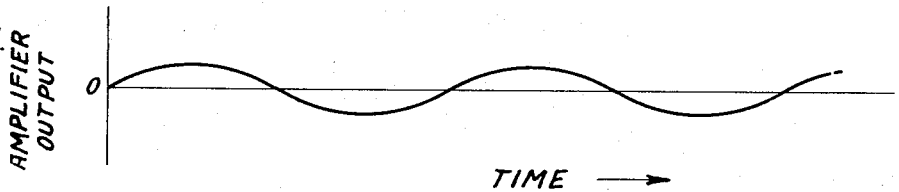
Figure 6C:
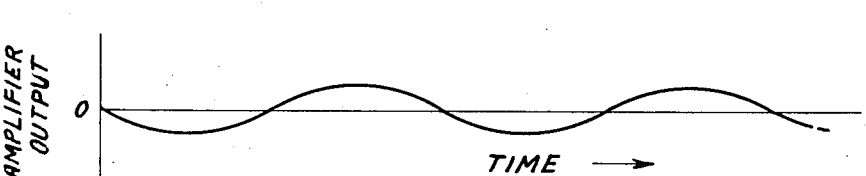

The direction of the laser frequency shift which has occurred, and thus the required direction of correction, is indicated by the phase relationship between the oscillator signal and the output from the tuned amplifier. Thus, in FIG. 5c, the amplifier output is out of phase with the oscillator signal while in FIG. 6c, it is in phase with the oscillator signal. The respective direction indicated by these phase differences depend on the emission relationship between the phase of light in paths $L_1$ and $L_2$. If the mirror in path $L_1$ has initially been set so that the light in path $L_1$ is $\pi$ radians ahead of the light in path $L_2$ when the laser is operating at the correct frequency, then an out-of-phase condition between the two signals received in the synchronous detector indicates that the laser frequency has shifted to a value less than that of the anomaly, while an in-phase condition indicates that the laser has shifted to a value greater than that of the anomaly. If desired, these indications can be reversed by initially setting the light in path $L_1$ to be $\pi$ radians behind the light in path $L_2$.

The output from the synchronous detector is a signal having a sign which indicates the required movement of the mirror for correction of the laser frequency and a level which indicates the amount of error. This signal is applied to the servo driver 23 which corrects the laser frequency by driving transducer 24 to shift the end mirror of the resonant cavity in the required direction.

FIG. 7 illustrates an alternative arrangement of the apparatus of this invention wherein the interferometer arm $L_2$ extends through the mirror 12 which defines the resonant cavity of the laser to a partially reflective beamsplitter 31 which transmits most of the emitted radiation as the power output beam while reflecting a portion suitable for use in the stabilizing system of this invention. The remaining elements of this apparatus are the same as described in connection with FIG. 1. The apparatus of FIG. 7 may be preferred if it is desired to keep the beamsplitter at a location outside of the resonant cavity.

Accordingly, the method and apparatus of this invention provide a highly sensitive arrangement for correcting a shift in the operating frequency of a laser. It is of particular note that measurement of any drift, both as to magnitude and direction, are obtained without the disadvantages of modulating either the laser frequency or the exciting energy and, furthermore, the apparatus required by this invention is simple and easily maintained compared to previous systems for laser stabilization.

While we have shown and described several alternative embodiments of this invention, it will be apparent to those skilled in the art that many changes and modifications may be made therein without departing from our invention in its broader aspects. We, therefore, intend the appended claims to cover all such changes and modifications as fall within the true spirit and scope of our invention.

What is claimed is:

1. A method of stabilizing the emission frequency of a laser including a resonant cavity and an active material which comprises the steps of:

providing a first path for a first beam of radiation emitted by said laser, said path having an optical length which includes a controllable variation;

providing a second path for a second beam of radiation emitted by said laser and passing through said active material;

setting said laser to emit at a frequency corresponding to an anomaly in the dispersion of said active material;

adjusting the optical length of said first path to produce a predetermined phase difference between the respective beams when said emitted radiation is at said frequency;

comparing the beam at the end of said second path with that at the end of said first path by permitting said beams to interfere;

detecting the amplitude of radiation produced from said interference of said beams; and changing said optical length of said resonant cavity to reduce to zero any component in said detected radiation which is at the frequency of said cyclic variation of the optical length of the first path.

2. The method of claim 1 in which the phase difference between the respective beams produced by adjusting the optical length of the first path is $\pi$ radians.

* * * * *